(No Model.) 9 Sheets—Sheet 1.
T. MOORE.
MACHINE FOR MAKING PIN TICKETS.
No. 525,351. Patented Sept. 4, 1894.
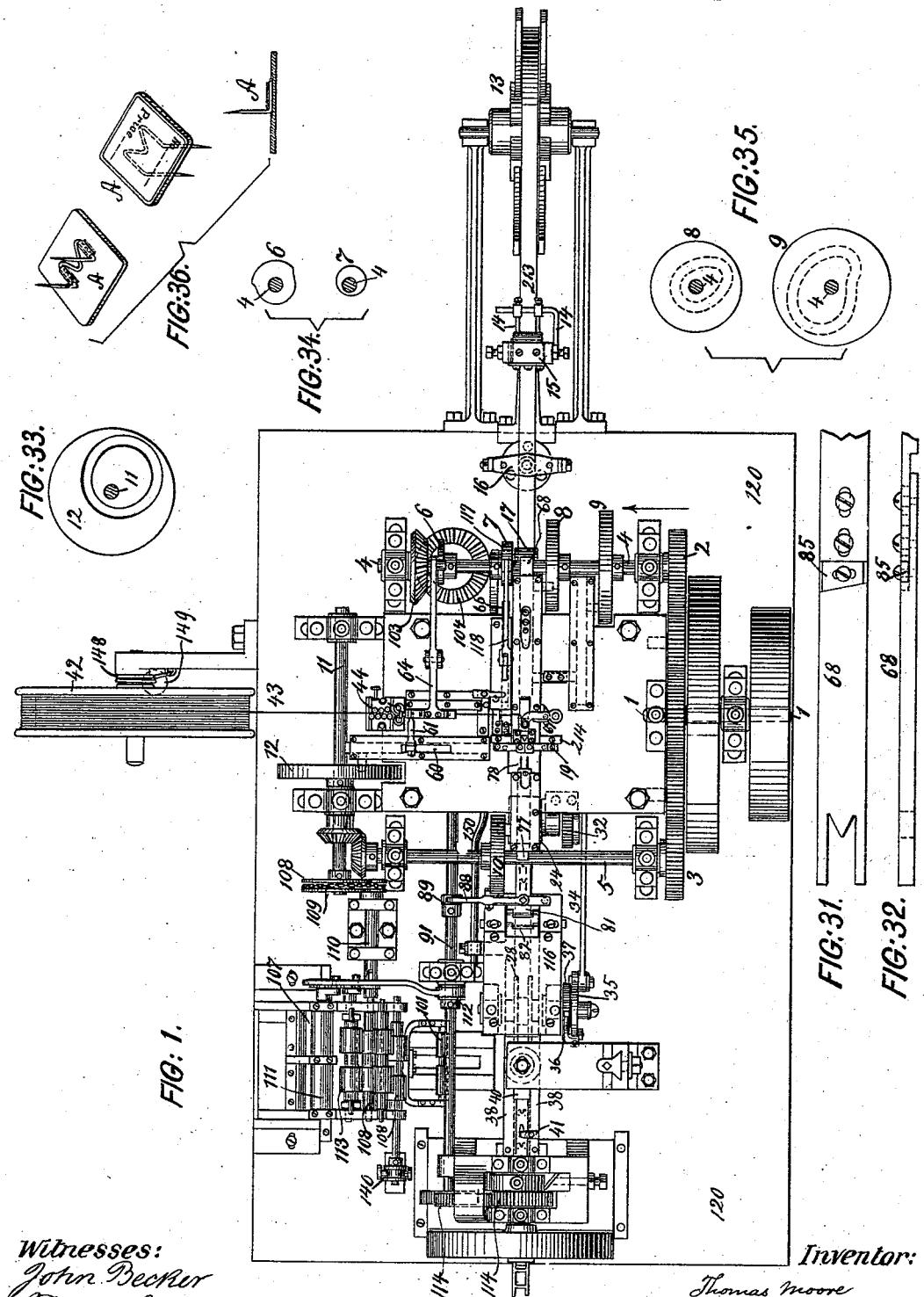
Witnesses:
John Becker
Theodore Becker.
Inventor:
Thomas Moore
by his attorneys
Roeder & Briesen (No Model.)　　　9 Sheets—Sheet 2.
T. MOORE.
MACHINE FOR MAKING PIN TICKETS.
No. 525,351.　　　Patented Sept. 4, 1894.
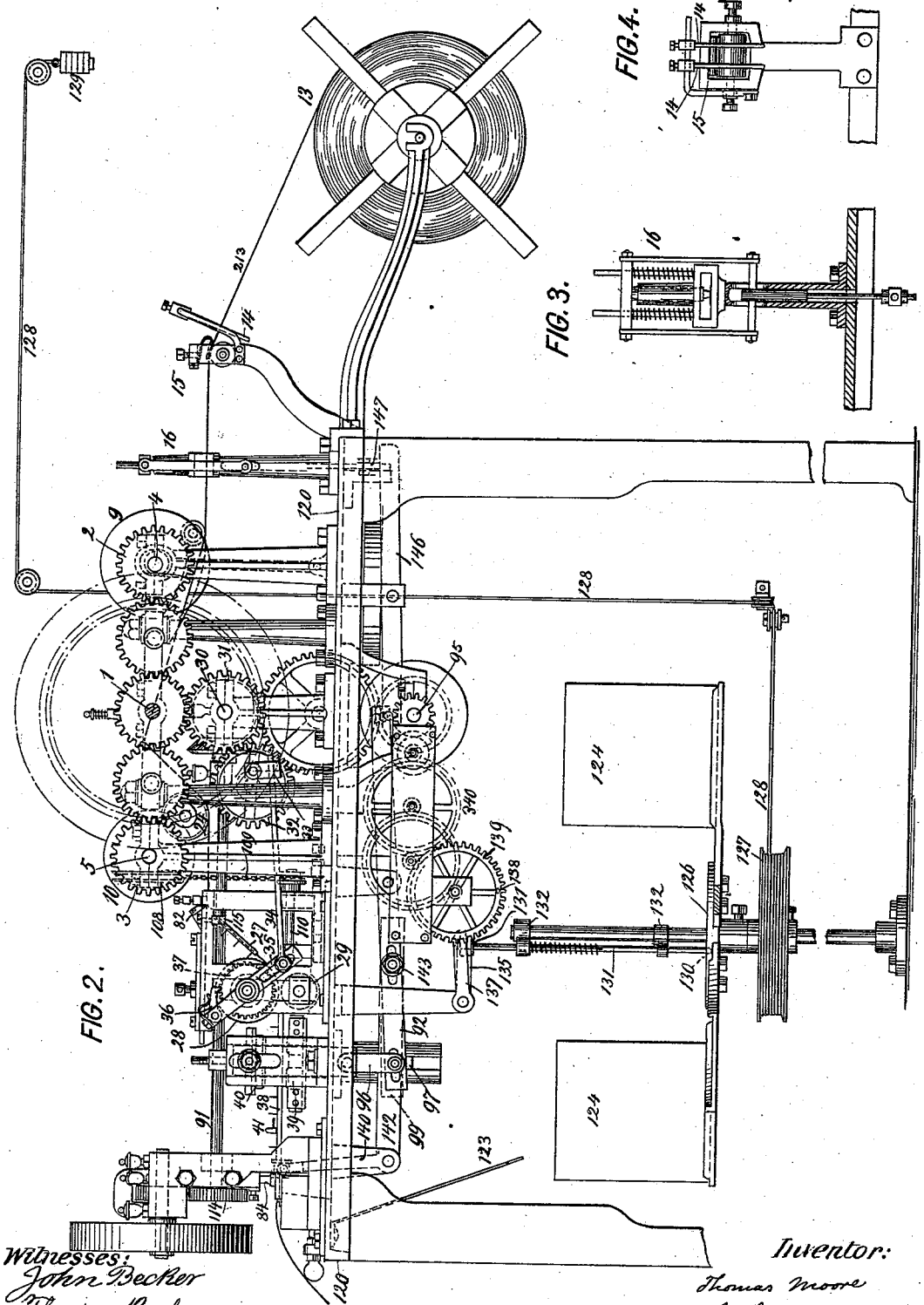
Witnesses:
John Becker
Theodore Becker
Inventor:
Thomas Moore
by his attorneys
Roeder & Briesen (No Model.) 9 Sheets—Sheet 3.

T. MOORE.
MACHINE FOR MAKING PIN TICKETS.

No. 525,351. Patented Sept. 4, 1894.

Witnesses:
John Becker
Theodore Becker

Inventor:
Thomas Moore
by his attorneys
Roeder & Briesen (No Model.) 9 Sheets—Sheet 4.
T. MOORE.
MACHINE FOR MAKING PIN TICKETS.
No. 525,351. Patented Sept. 4, 1894.
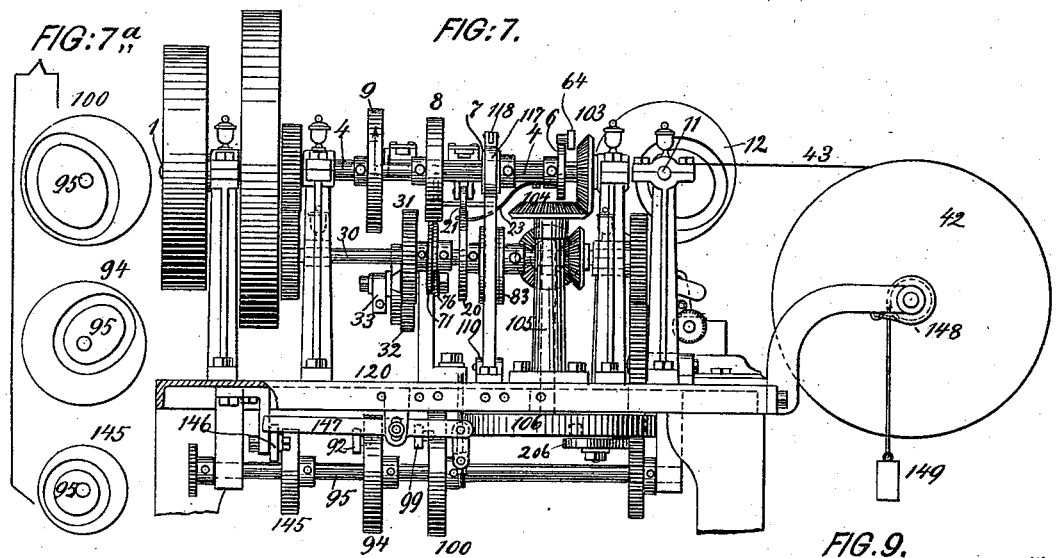
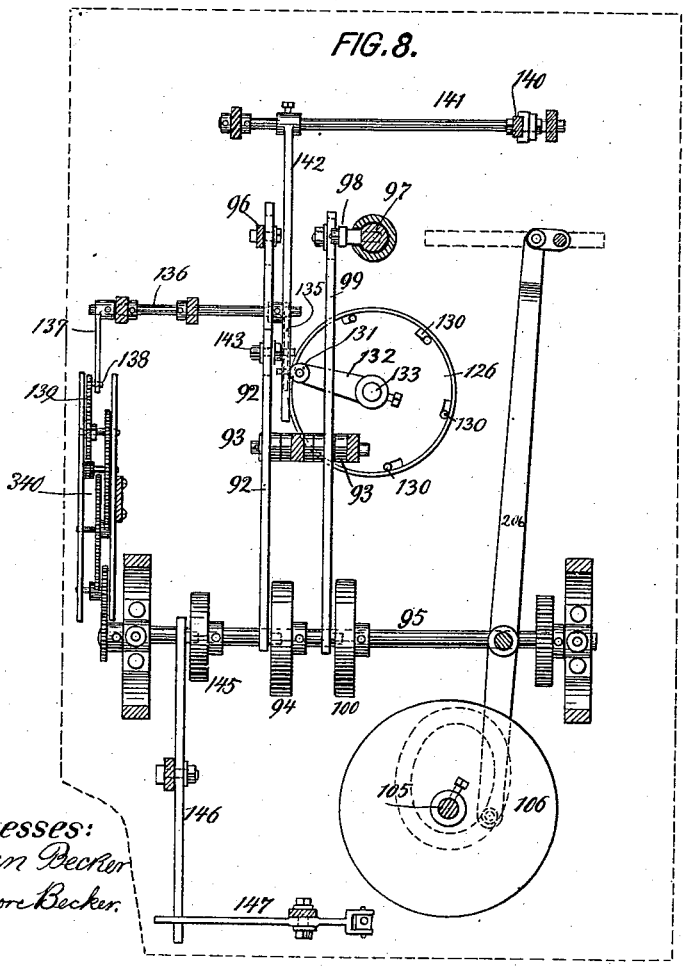
Witnesses:
John Becker
Theodore Becker
Inventor:
Thomas Moore
by his attorneys
Roeder & Briesen (No Model.) 9 Sheets—Sheet 5.
T. MOORE.
MACHINE FOR MAKING PIN TICKETS.
No. 525,351. Patented Sept. 4, 1894.
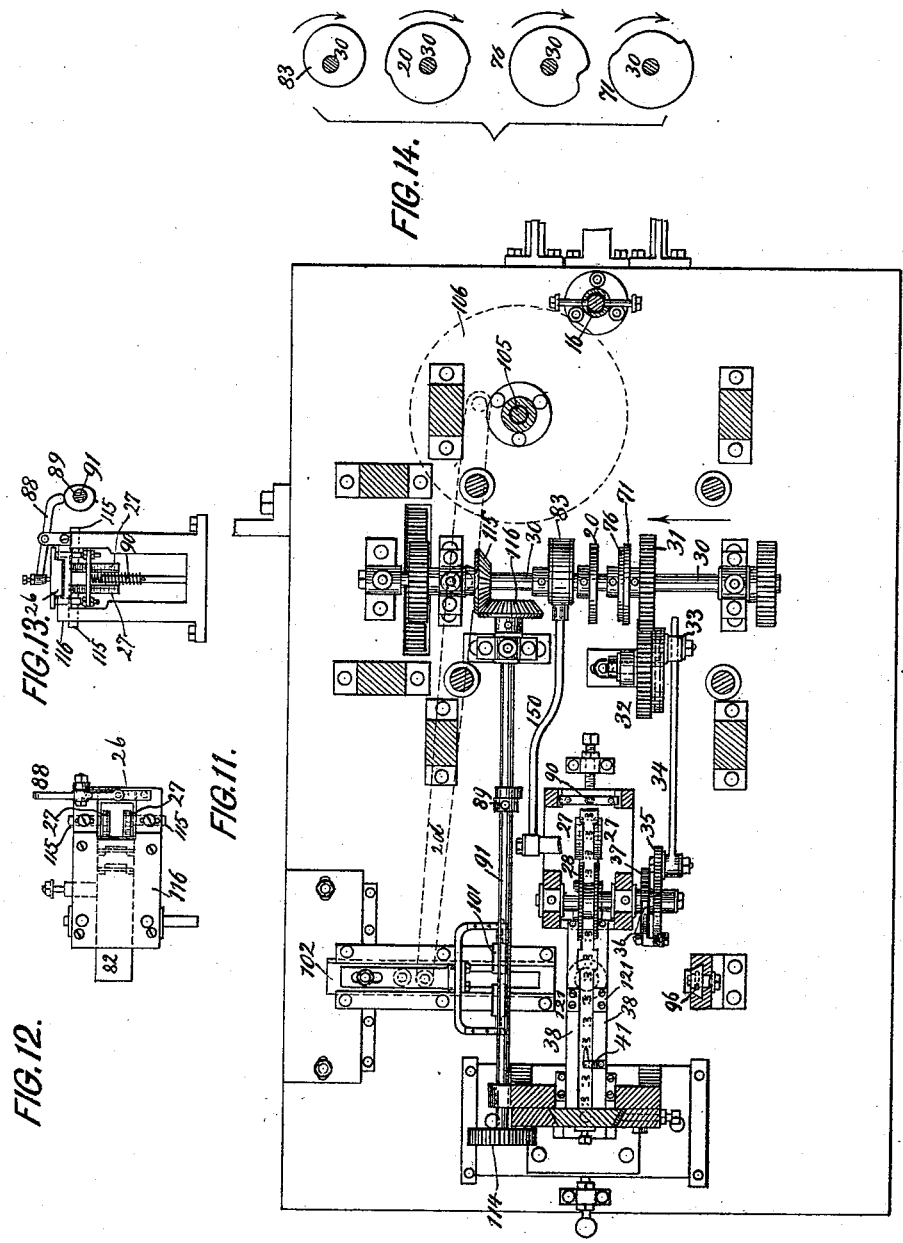
Witnesses:
John Becker
Theodore Becker.
Inventor:
Thomas Moore
by his attorneys
Loeder Brieven
THE NORRIS PETERS CO., PHOTO-LITHO., WASHINGTON, D. C.

(No Model.) 9 Sheets—Sheet 6.
T. MOORE.
MACHINE FOR MAKING PIN TICKETS.
No. 525,351. Patented Sept. 4, 1894.
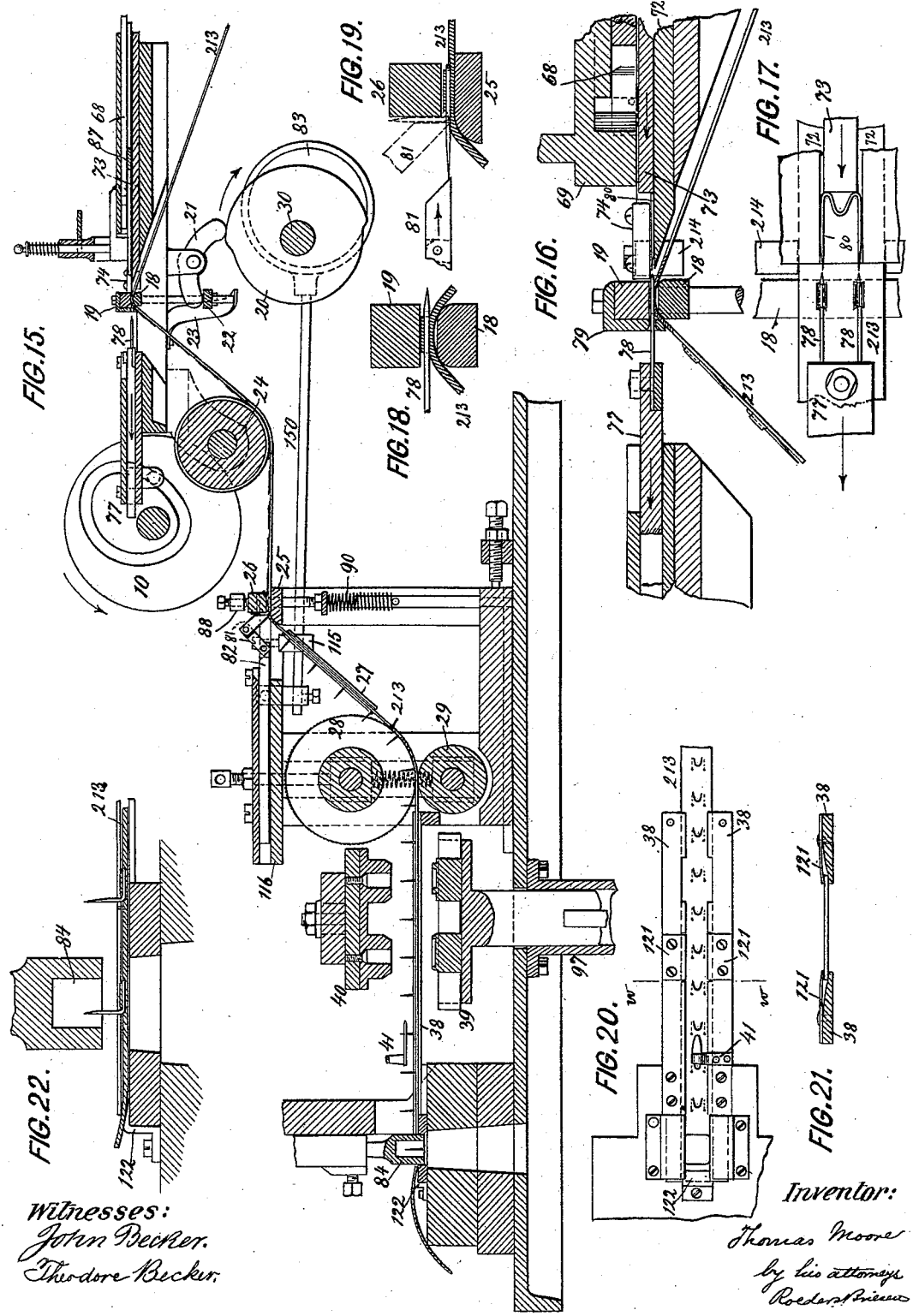
Witnesses:
John Becker.
Theodore Becker.
Inventor:
Thomas Moore
by his attorneys
Roeder & Brees

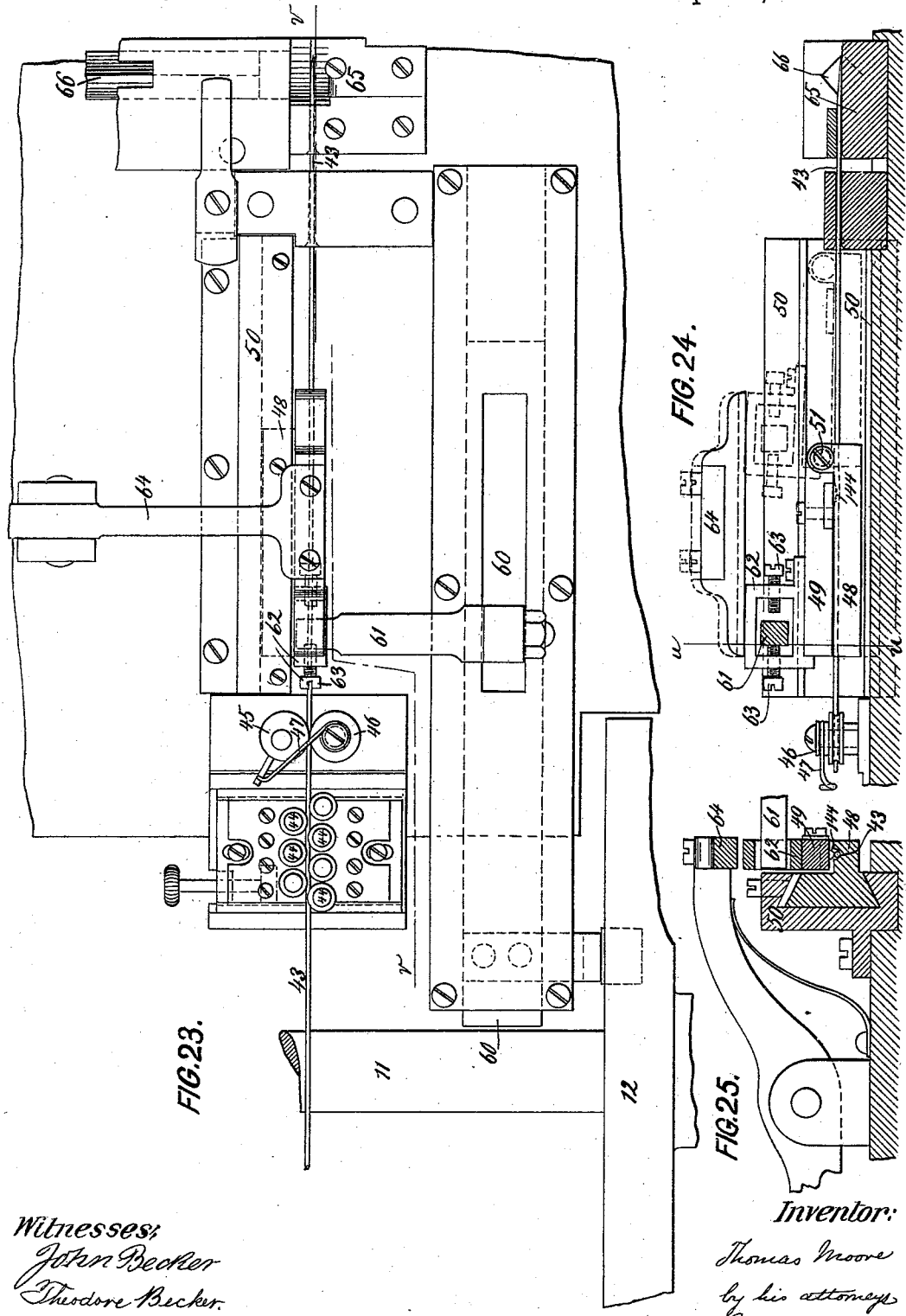

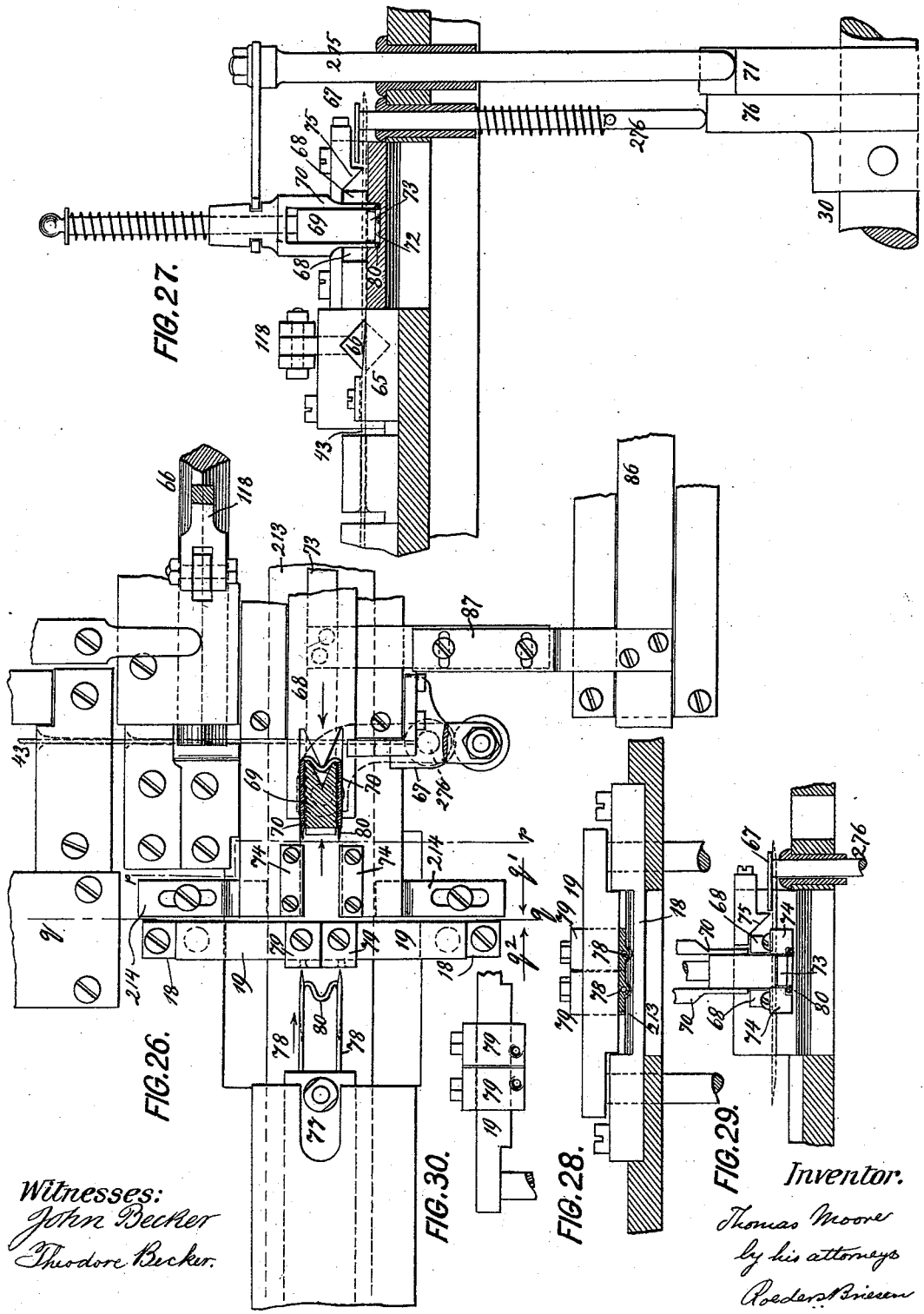

(No Model.) 9 Sheets—Sheet 9.

T. MOORE.
MACHINE FOR MAKING PIN TICKETS.

No. 525,351. Patented Sept. 4, 1894.

Witnesses:
John Beeker
William Schultz

Inventor:
Thomas Moore
by his attorneys
Roeder & Briesen

UNITED STATES PATENT OFFICE.

THOMAS MOORE, OF BROOKLYN, NEW YORK, ASSIGNOR TO THE THOMAS MANUFACTURING COMPANY, OF WILMINGTON, DELAWARE.

MACHINE FOR MAKING PIN-TICKETS.

SPECIFICATION forming part of Letters Patent No. 525,351, dated September 4, 1894.

Application filed March 2, 1894. Serial No. 502,082. (No model.)

*To all whom it may concern:*

Be it known that I, THOMAS MOORE, of Brooklyn, Kings county, New York, have invented an Improved Machine for Making Pin-Tickets, of which the following is a specification.

This invention relates to a machine for making pin tickets which are adapted to be secured to fibrous materials, so as to mark the size, quality or price of the goods. These tickets consist of a paper tag through the body of which a bent pin or staple passes first lengthwise and is then bent up, so that the shanks of the staple stand off at approximately right angles to the face of the ticket.

My improved machine produces the pin ticket automatically from a strip of paper and a coil of wire. It cuts the wire into proper lengths, bends it into the shape of a staple, pushes it into the paper which has previously been perforated, turns up the shanks of the staple, and then prints, severs and counts the tickets.

Figure 5:
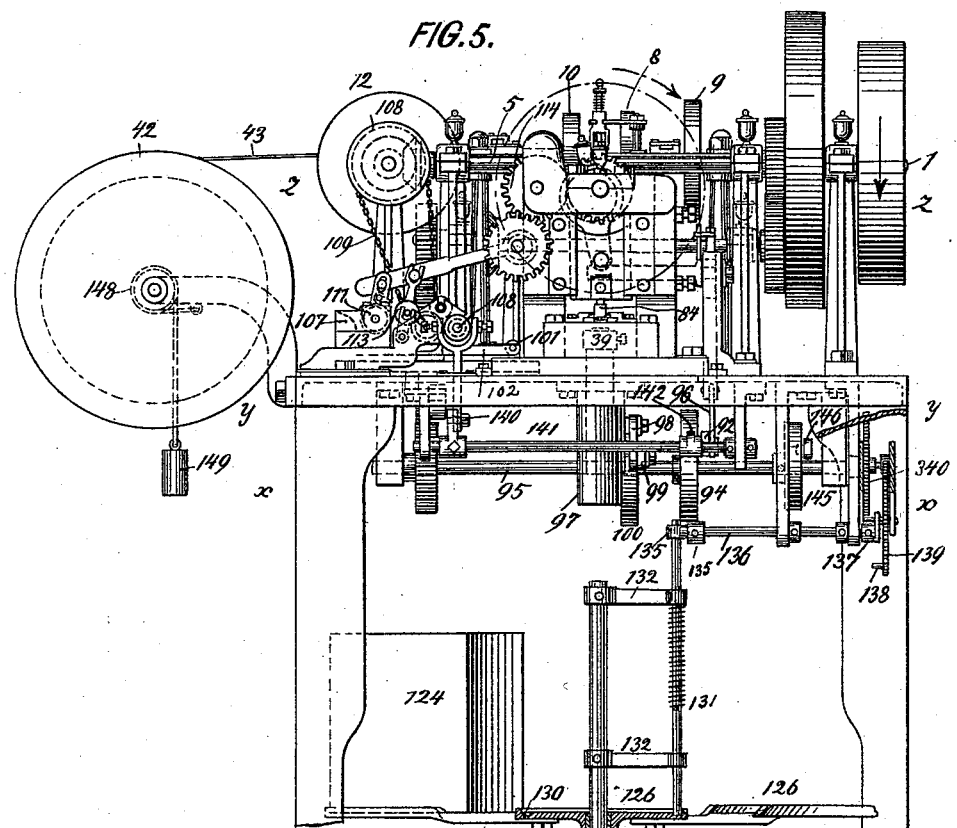
Figure 6:
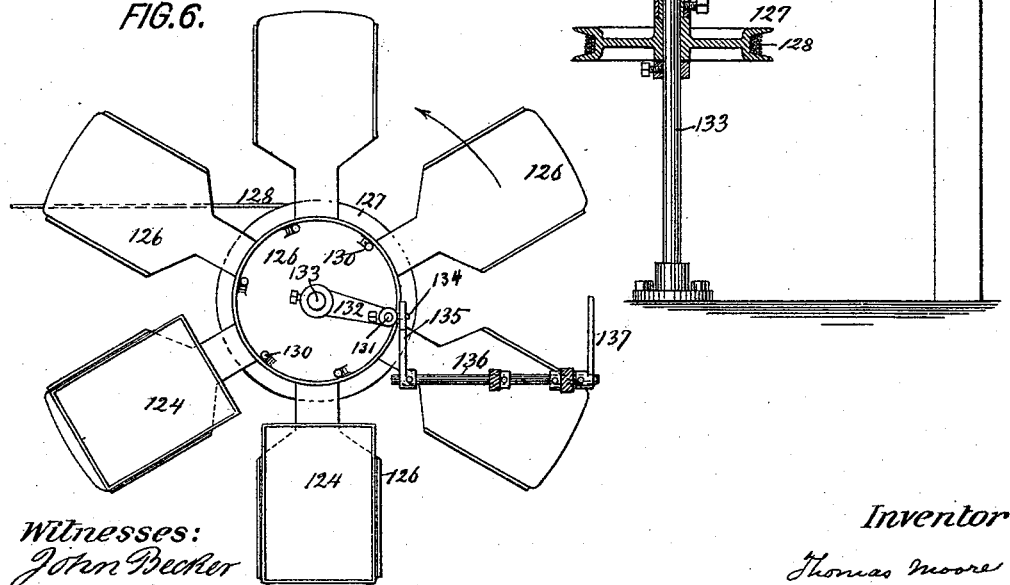
Figure 37:
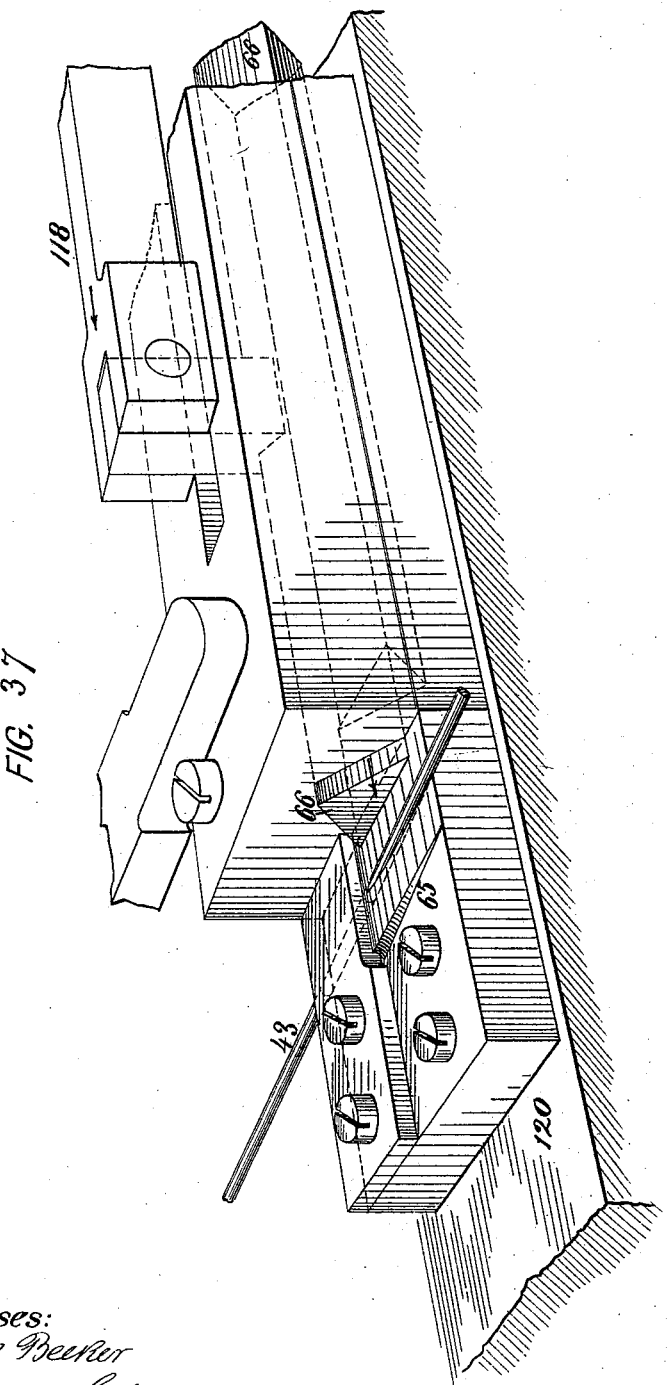

In the accompanying drawings: Figure 1 is a plan of the machine; Fig. 2 a side elevation thereof; Fig. 3 an elevation, partly in section, of the stamping device 16; Fig. 4 an elevation of the tension device 15; Fig. 5 a front elevation of the machine, partly in section; Fig. 6 a section on line $x, x$, Fig. 5, looking downward; Fig. 7 a rear elevation of the upper part of the machine, with reel, tension and stamping device omitted; Fig. 7$^a$ a detail of cams on shaft 95; Fig. 8 a section on line $y, y$, Fig. 5; Fig. 9 a side elevation of the yoke 117, for operating the shear blade; Fig. 10 a side elevation of lever 64 for locking the shuttle; Fig. 11 a section on line $z, z$ Fig. 5; Fig. 12 a plan of the frame 116; Fig. 13 an end elevation of the same; Fig. 14 a detail of cams on shaft 30; Fig. 15 a detail central longitudinal section of the upper part of the machine; Fig. 16 a detail longitudinal section of the paper perforating device; Fig. 17 a detail plan thereof; Fig. 18 an enlarged vertical section of the clamping mechanism 18, 19; Fig. 19 an enlarged vertical section of the turning up mechanism; Fig. 20 a plan of the paper guide 38; Fig. 21 an enlarged section on line $w, w$, Fig. 20; Fig. 22 a detail vertical longitudinal section through the punch 84; Fig. 23 a detail plan view of the wire feeding and cutting mechanism; Fig. 24 a vertical longitudinal section on line $v, v$, Fig. 23; Fig. 25, a vertical transverse section on line $u, u$, Fig. 24; Fig. 26 a plan, partly in section, of the perforating, cutting and bending mechanism; Fig. 27 a vertical longitudinal section on line $p, p$, Fig. 26; Fig. 28, a section on line $q, q$, Fig. 26, looking in the direction of the arrow $q'$; Fig. 29 a similar section, looking in the direction of the arrow $q^2$; Fig. 30 a detail view of the needle guides 79; Fig. 31 a plan of the slide 68; Fig. 32 a side view thereof; Fig. 33 a side view of the shuttle-driving cam 12; Fig. 34 a side view of cams 6 and 7; Fig. 35 a side view of cams 8 and 9; and Fig. 36, two perspective views and a section of the pin ticket produced by the machine. Fig. 37 is a perspective view of the shearing mechanism.

The numeral 1 (Fig. 1) represents the power shaft which imparts motion by gear wheels 2, 3, to shafts 4, 5, of which the shaft 4 carries cams 6, 7, 8 and 9. The cam 6 operates the lever 64, for clamping the shuttle to the wire. The cam 7 operates the shears for cutting the wire; the cam 8 operates the slide for bending the wire into a staple, and the cam 9 operates the bar for pushing the staple into the paper. The shaft 5 carries the cam 10 for operating the needles that perforate the paper. This shaft moreover transmits motion by bevel gear to shaft 11, that carries cam 12 for operating the wire-feeding shuttle.

13 is the reel that carries the paper strip 213, from which the tickets are subsequently cut. This strip passes through a guide 14 and a tension device 15, and thence through a stamping device 16, that embosses the "patent" mark and that is operated by cam 145 and levers 146, 147, from shaft 95 (Fig. 8). From the stamp 16, the strip passes under a guide roller 17, between centering slides 214, and thence between a lower fixed jaw or block 18, and an upper movable jaw 19, of a clamp, (Figs. 15 and 16.) The fixed jaw 18, has a grooved working surface (Fig. 18), so that the paper lies hollow and permits the needles to penetrate it freely. The upper movable jaw 19, is lowered by means of a cam 20, (Fig. 15) and lever 21, that engages a yoke 22, secured to the jaw, while it is raised by a spring 23, that operates in a direction contrary to that of the cam. From the clamp 18, 19, the strip 213, passes under a flanged roller 24, through a clamp 25, 26, and thence over guides 27. These guides are mounted on blocks 115, secured by adjusting screws to a slotted frame 116. Thus the guides may be adjusted to accommodate different widths of paper (Fig. 12). From the guides 27, the paper passes to the yielding and adjustable feed rollers 28, 29, of which the roller 28, is intermittently driven from shaft 30 (Figs. 2 and 11) by gearing 31, 32, crank 33, rod 34, oscillating lever 35, pawl 36 and ratchet 37, which is keyed to the shaft of roller 28. Thence the strip passes through guides 38 (Fig. 20), between the printing blocks 39, 40 (Fig. 15), to the punch 84, which cuts it up into tickets. Between the printing blocks, the guide 38, is provided with spring clamps 121, for holding the strip taut (Fig. 21). In front of the punch, there is a small spreader 41, for bending the shanks of the staple apart, in case they should converge.

42 (Fig. 1), is the reel that carries the wire 43, and that is provided with a tension pulley 148 and weight 149 (Fig. 7). The wire passes through the straightening rollers 44 (Fig. 23) and thence between clamping rollers 45, 46, which permit the wire to pass forward, but not to pass backward. To this effect the upper roller 45, is mounted eccentrically on its shaft and is acted upon by a spring 47, which has a tendency to clamp it upon the wire under a backward pull.

From the rollers 45, 46, the wire 43, passes between the two jaws 48, 49 of a shuttle that reciprocates in race 50 (Fig. 24). The upper jaw is pivotally connected to the lower jaw by pin 51, and is adapted to open and close upon the wire, which it engages by tooth 144 (Fig. 25). Motion is imparted to the shuttle from shaft 11 (Fig. 23) by cam 12, slide 60 and arm 61, that engages a box 62 (Fig. 24) rigidly secured to jaw 49. In order to change the throw of the shuttle, the box is provided with set screws 63, against which the arm 61 bears. The upper jaw 49 is clamped upon the wire 43, when the shuttle is in its initial position, by means of the lever 64 (Figs. 23 and 25) so that the shuttle takes the wire along during its forward throw, while when the shuttle is at the end of its race, the lever releases the shuttle, so that the latter is free to slide backward upon the wire without engaging the same. In this way intermittent forward motion is imparted to the wire. The wire is by the shuttle fed into a shearing device 65, 66, (Figs. 1, 26 and 27) and beneath an inclined guide 75. Of the shearing device the lower blade 65 is fixed, while the upper blade 66 is reciprocated by eccentric 7. This eccentric engages a yoke 117 (Fig. 9) which is connected to the shear blade by a link 118. The yoke is moreover pivoted to a foot 119 adjustable on the bed plate 120, by means of bolts engaging elongated slots of the plate so that the play of the shears may be adjusted.

Each throw of the shuttle feeds a length of wire sufficient to form one staple, which is then severed and pointed by the shears in the manner described. During the cutting operation, the free end of the wire is held by a clamp 67, operated by cam 76 and lifter 276 (Fig. 27) and which prevents the wire from being thrown out of line. The severed section of wire is next bent into the form of a staple by means of a slide 68, which is operated by the cam 8, and presses the wire against a fixed former 69 (Figs. 16. 26. 27. and 29).

The slide 68, is made adjustable by being composed of two sections connected by pins secured to one section and passing through elongated slots of the other section. Between the two sections is interposed an adjustable wedge 85, so that different thicknesses of wire may be used (Figs. 31 and 32). The former 69 constitutes in effect a male die, which has the shape to be imparted to the staple, while the slide 68, constitutes the female die. The drawings show dies for making an M shaped staple, but it is obvious that the form of the dies may be changed at pleasure, so as to produce U-shaped and other staples.

After the wire has been bent into the form of a staple around the former, it is engaged by a vertically reciprocating stripper 70, that straddles the former 69, and is operated by a cam 71 on shaft 30, by lifter 215 (Fig. 27). The stripper pushes the staple beneath the lower face of the former and upon a grooved bed 72. Here the staple is engaged by a push bar 73 (Figs. 16 and 17) operated by cam 9, through slide 86 which is connected to push bar 73, by an adjustable arm 87, which allows the push bar to be set according to the length of the staple (Fig. 26).

The push bar 73 pushes the staple beneath guides 74, into the paper, which has previously been perforated by the needles in the following manner: The cam 10 reciprocates the needle bar 77, carrying two perforating needles 78, (Fig. 15,) which operate parallel to, but in a direction opposite to that of the feed of the strip 213. The needles engage the paper while the latter is bent over the block 18 (Fig. 18), and is clamped in place by the jaw 19. In this way the needles make two perforations through the paper, and if the latter is made of sufficient thickness, these perforations will extend only through the back of the paper, but will be invisible at the front (Fig. 18). If desired, however, the perforations may extend through the entire thickness of the paper.

I prefer to interpose between the needles and the paper, two perforated guide blocks 79, through which the needles pass and which are made vertically adjustable to regulate the depth of the perforations, (Figs. 16 and 30.)

Into the perforations formed by the needles the staple 80 is pushed by the push bar 73, in the manner already described. The paper with the staple in place is next fed to the clamp 25, 26 (Fig. 15), which holds it down by the action of its upper movable jaw 26. This jaw is operated by a spring 90 and a lever 88 through cam 89, fast on shaft 91 (Figs. 12 and 13). The clamp 25, 26, holds the paper in place against the action of a bending finger 81, which turns up the two shanks of the staple at approximately right angles to the paper (Figs. 15 and 19). This finger 81, is composed of two pivotally connected sections, of which the rear section is pivoted to a slide 82, driven by rod 150 and eccentric 83 from shaft 30 (Fig. 15). During the backward motion of the slide, the finger straightens out, while during the forward motion, it buckles and its beveled front section passes beneath the shanks of the staple and turns them upward (Fig. 19). The staples are now completed and are properly secured to the paper strip. This strip is next passed through a printing device 39, 40, hereinafter described and thence to the spreader 41 and punch 84 (Fig. 15), which cuts it up into tickets, of which each one contains one staple.

The punch is hollow (Fig. 22) to accommodate the staple-shanks. It is operated as follows: The shaft 30 by bevel gear 115, 116, drives shaft 91, upon which is fast a gear wheel of a train 114. This wheel by an intermediate wheel drives a corresponding wheel of the same train 114, secured to an eccentric that engages the punch-operating slide. Back of the punch there is a lifter 122, for raising the strip off the die.

The printing device consists of the printing block 39 and the hollow impression block 40 adapted to receive the upwardly projecting staple shanks. The impression block 40 is adjustable and is reciprocated vertically by link 96, lever 92 turning on fulcrum 93, and cam 94 mounted on shaft 95 (Fig. 8).

The printing block 39 is operated by slide 97 connected by link 98 to lever 99, turning on fulcrum 93, and operated by cam 100 fast on shaft 95. The printing block is inked by means of the inking rollers 101, that are secured to a slide 102, which receives motion from shaft 4, by means of bevel wheels 103, 104, shaft 105, cam 106 and lever 206 (Figs. 1. 7. 8. and 11). The inking rollers 101 receive the ink from fountain 107, through fountain roller 111, doctor roller 113 and distributing rollers 108 (Figs. 1 and 5). The fountain roller 111 is operated by eccentric 112 fast on shaft 91, while the distributing rollers are revolved from shaft 11, by chain wheel 108, chain 109, and shaft 110. One of the rollers 108 reciprocates laterally to break up the ink. This motion is imparted by lever 140, mounted on rock shaft 141, slotted lever 142, engaged by adjustable pin 143 of lever 92, and cam 94 fast on shaft 95 (Figs. 5 and 8).

The tickets A having been printed and severed and being thus entirely finished, are dropped into a counting attachment by chute 123 (Figs. 2. 5 and 6). This attachment consists of a series of boxes 124, arranged upon the radial arms of a hub or disk 126. This disk has a tendency to be revolved by a pulley 127, rope 128, and weight 129. The disk 126 is provided with a set of indentations 130, engaged by a spring stop 131. This stop is guided in arms 132 of a stud 133, and is on top provided with a pin 134, that engages a forked lever 135. This lever is fast on rock-shaft 136, provided at the opposite end with an arm 137, adapted to be engaged by a pin 138 of a wheel 139. This wheel is continuously revolved by train 340 from shaft 95. When the pin 138 strikes the arm 137, the spring stop 131 is momentarily raised to release disk 126, which is thus free to be revolved by weight 129, until the spring stop 131, engages the next indentation of the disk, when the disk is again arrested. In this way a full box 124 is withdrawn from under the chute 123, and is replaced by an empty box, which remains in position, until it, in turn, becomes filled. Thus an equal number of tickets is dropped into each of the boxes, which number may be readily varied, by changing the intermediate gearing of the counting apparatus.

What I claim is—

1. In a machine for making pin tickets, the combination of a paper feed with a wire feed, a wire cutter, a wire bending slide, a former, and a push bar reciprocating parallel to the direction of the paper feed, for pushing the bent wire into the paper, substantially as specified.

2. The combination of a paper feed with needles reciprocating parallel to the line of feed, a wire feed, a wire cutter, a wire bending slide, a former, and a push bar, for pushing the bent wire into the paper, substantially as specified.

3. The combination of a paper feed with needles reciprocating parallel to the line of feed, a wire feed, a wire cutter, a wire bending slide, a former, a push bar and an upsetting finger, substantially as specified.

4. The combination of a paper feed with needles reciprocating parallel to the line of feed, an intermittent wire feed operating at right angles to the paper feed, a wire cutter, a wire bending slide, a former, a push bar and an upsetting finger, substantially as specified.

5. The combination of a paper feed with needles reciprocating in the line of feed, an intermittent wire feed, a wire cutter, a wire bending slide, a former, a stripper, a push bar and an upsetting finger, substantially as specified.

6. The combination of a paper feed with needles reciprocating in the line of feed, a lower flattened block around which the paper is bent, an upper movable clamping block, a wire feed, a cutter, a wire bending slide, a former, a push bar and an upsetting finger, substantially as specified.

7. The combination of a paper feed with a wire feed, a pair of needles, a wire cutter, a wire bending slide, a former, a push bar, an upsetting finger and a punch for severing the tickets, substantially as specified.

8. The combination of a paper reel with a feed roller, needles reciprocating in the line of feed, a wire reel, a wire feed operating in a direction at right angles to the paper feed, a wire cutter, a wire bending slide, a former, and a push bar, substantially as specified.

9. The combination of a paper reel with a feed roller, needles reciprocating in the line of feed, a wire reel, a wire feed operating at right angles to the paper feed, a wire cutter, a wire bending slide, a former, a push bar, an upsetting finger and a punch, substantially as specified.

10. The combination of a pair of clamping jaws with a jointed upsetting finger for turning up the shanks of the staple, a slide to which the finger is connected, and a spreader 41 adapted to enter between and distend the shanks of the staple, substantially as specified.

11. The combination of a shuttle composed of pivotally connected jaws 48, 49 with lever 64 adapted to engage and lock the movable jaw of the shuttle, and with a cam 12, slide 60 and arm 61 for feeding the shuttle, substantially as specified.

12. The combination of a shuttle composed of pivotally connected jaws 48, 49, and box 62, with set screws 63, an operating arm 61, engaged thereby, and a clamping lever 64, substantially as specified.

13. The combination of a male former 69, with a female slide 68, composed of two adjustable sections, and with an adjustable wedge 85, between such sections, substantially as specified.

14. The combination of a paper feed with a wire feed shuttle, a wire cutter, a wire bending slide, a former, a push bar and a pair of needles reciprocating in the line of paper feed, an upsetting finger, a hollow impression block 40, and a printing block 39, substantially as specified.

15. The combination in a machine for making pin tickets, of a revolving indented disk, with a series of radially arranged boxes, a power pulley 127, spring stop 131 having pin 134, forked lever 135 engaged thereby, rock shaft 136 having arm 137, and with wheel 139 having pin 138 and which is connected to the driving mechanism of the machine, substantially as specified.

THOMAS MOORE.

Witnesses:
F. v. BRIESEN,
WILLIAM SCHULZ.